(12) United States Patent
Huang

(10) Patent No.: US 11,414,015 B2
(45) Date of Patent: Aug. 16, 2022

(54) VEHICLE BLIND SPOT DETECTION SYSTEM

(71) Applicant: Tsung-Ming Huang, Changhua (TW)

(72) Inventor: Tsung-Ming Huang, Changhua (TW)

(*) Notice: Subject to any disclaimer, the term of this patent is extended or adjusted under 35 U.S.C. 154(b) by 527 days.

(21) Appl. No.: 16/560,774

(22) Filed: Sep. 4, 2019

(65) Prior Publication Data

US 2021/0061175 A1 Mar. 4, 2021

(51) Int. Cl.
*B60R 1/12* (2006.01)
*B60R 1/08* (2006.01)

(52) U.S. Cl.
CPC .............. *B60R 1/1207* (2013.01); *B60R 1/08* (2013.01); *B60R 2001/1215* (2013.01)

(58) Field of Classification Search
CPC .. B60R 1/1207; B60R 1/08; B60R 2001/1215
See application file for complete search history.

(56) References Cited

U.S. PATENT DOCUMENTS 8,083,386 B2* 12/2011 Lynam ................. B60R 1/0602
362/494
2017/0092134 A1* 3/2017 Kendall .................... B60R 1/12

* cited by examiner

*Primary Examiner* — Sath V Perungavoor
*Assistant Examiner* — Tyler B Edwards
(74) *Attorney, Agent, or Firm* — Che-Yang Chen; Law Office of Michael Chen

(57) ABSTRACT

A vehicle blind spot detection system may include a rearview mirror and an indicating unit. The rearview mirror has a shell and a mirror, and a transmitting area is formed on the mirror. The indicating unit installed in the shell is horizontally aligned with the transmitting area of the mirror. The indicating unit comprises a light-guiding base and a circuit board, and a front side of the light-guiding base has a recess to form a first housing, a light-gathering room, and a second housing therein. A first light emitter and a second light emitter are respectively mounted on the circuit board, and the circuit board has a through hole. When the circuit board is coupled on a rear side of the light-guiding base, the first light emitter and the second light emitter are respectively accommodated in the first housing and the second housing.

6 Claims, 7 Drawing Sheets

A-A

B-B

VEHICLE BLIND SPOT DETECTION SYSTEM

FIELD OF THE INVENTION

The present invention relates to a vehicle blind spot detection system and more particularly to a vehicle blind spot detection system that can significantly reduce glare when used in nighttime.

BACKGROUND OF THE INVENTION

Rearview mirrors are installed on both sides of a vehicle to allow the driver to see the rear side of the vehicle and to determine whether there is an incoming car on either sides of the vehicle before changing lane. However, since there are still blind spots that cannot be fully observed from the two rearview mirrors, many vehicle manufactures have introduced the technology of vehicle blind spot detection system that is equipped with sensors to support the driver. The vehicle blind spot detection system is installed in two cases of the rearview mirrors. When a rear vehicle enters the blind spot area, the vehicle blind spot detection system can detect through the sensors thereof and a LED light emitter of the vehicle blind spot detection system is adapted to emit light passing through a transmitting area of the rearview mirror as indicator to warn the driver.

However, the conventional vehicle blind spot detection system has following disadvantages: The LED light from the rearview mirror is a point light source that is emitted in a straight way, so that when it is used in the night environment, it will be very dazzling and be easy to scare the driver so as to cause unexpected traffic accidents. Therefore, there remains a need for a new and improved design for a vehicle blind spot detection system to overcome the problems presented above.

SUMMARY OF THE INVENTION

The present invention provides a vehicle blind spot detection system which comprises a rearview mirror and an indicating unit. The rearview mirror has a shell and a mirror, and a transmitting area is formed on the mirror. The indicating unit installed in the shell is horizontally aligned with the transmitting area of the mirror. The mirror is used for viewing the area behind a vehicle, so that the moving direction of the vehicle is defined as the front side. The indicating unit comprises a light-guiding base and a circuit board, and a front side of the light-guiding base has a recess to form a first housing, a light-gathering room, and a second housing therein. The first housing and the second housing are formed in the same vertical plane at different heights, and the light-gathering room is communicated with a bottom edge of the first housing and formed at the same height of the second housing. Each of the first housing and the second housing has an inclined light-guiding surface at the same lateral side thereof which is gradually expanded from front to rear, and the light-guiding surface of the second housing is located adjacent to the light-gathering room. A curved light-emitting surface is formed at a bottom edge of the light-gathering room. A first light emitter and a second light emitter are respectively mounted on the circuit board, and the circuit board has a through hole. When the circuit board is coupled on a rear side of the light-guiding base, the first light emitter and the second light emitter are respectively accommodated in the first housing and the second housing. The circuit board comprises a terminal pin, and the light-guiding base has a connecting portion formed at a position corresponding to the terminal pin. The terminal pin is configured to be positioned in the connecting portion, so that the terminal pin and the connecting portion are adapted to electrically connect to blind spot sensors installed on two lateral sides of the vehicle through terminal wires. A rear side of the circuit board is connected to the mirror, and the light-gathering room, the through hole, and the transmitting area are horizontally aligned.

Comparing with conventional vehicle blind spot detection system, the present invention is advantageous because: (i) the light from the first light emitter is configured to pass through and be refracted by the light-guiding surface and collected by the light-gathering room, and then the lights are diffused evenly through the curved light-emitting surface and emitted through the through hole to the transmitting area, and the indirect irradiation and uniform diffusion of light can significantly reduce glare when used in nighttime, thereby avoiding the unexpected traffic accidents; and (ii) the second light emitter is turned on with the first light emitter at the same time, and the light from the second light emitter is configured to pass through and be refracted by the light-guiding surface in the second housing so as to become fill light for the first light emitter, thereby avoiding the situation that the light is too dim when the first light emitter is used alone.

BRIEF DESCRIPTION OF THE DRAWINGS

FIG. 7 is a schematic view illustrating a transmitting area of a mirror of the vehicle blind spot detection system of the present invention is lit on.

DETAILED DESCRIPTION OF THE INVENTION

Figure 1:
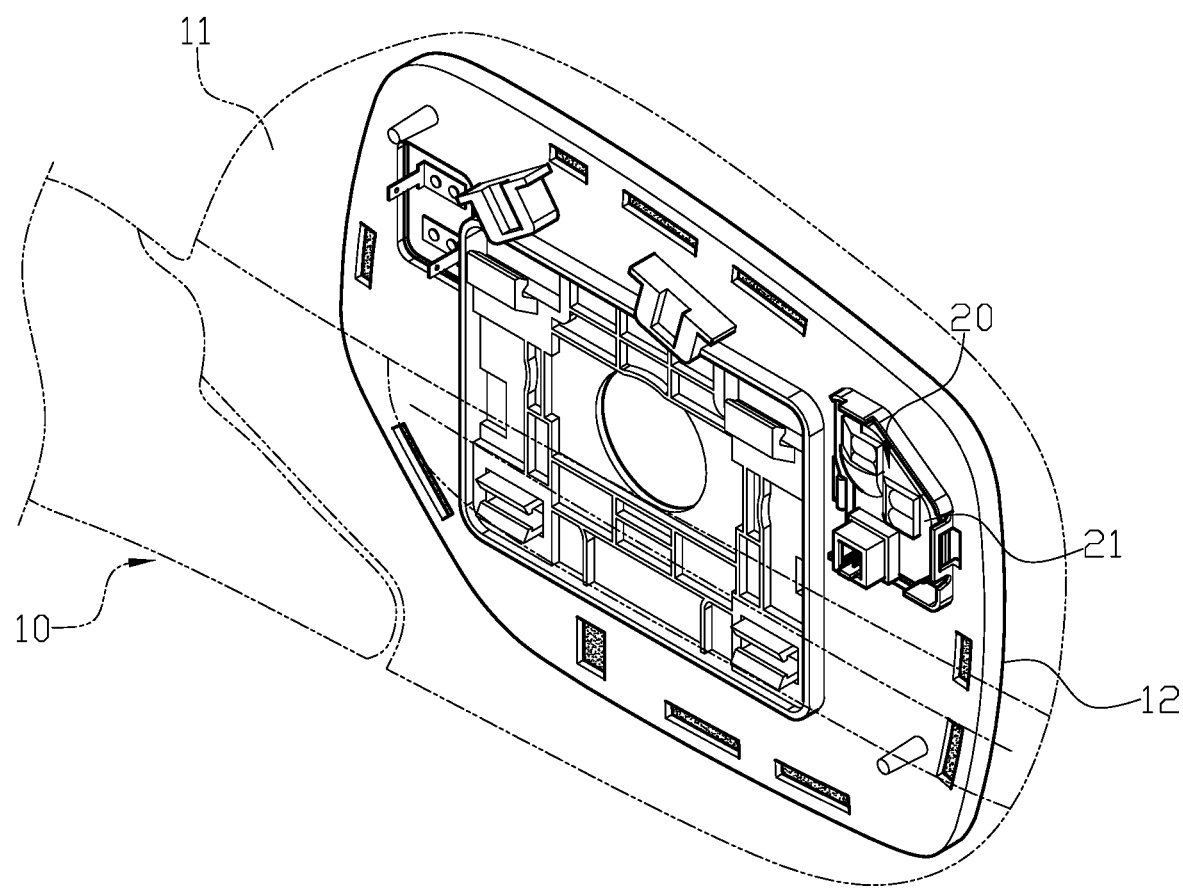
FIG. 1 is a three-dimensional assembly view of a vehicle blind spot detection system of the present invention.
Figure 2:
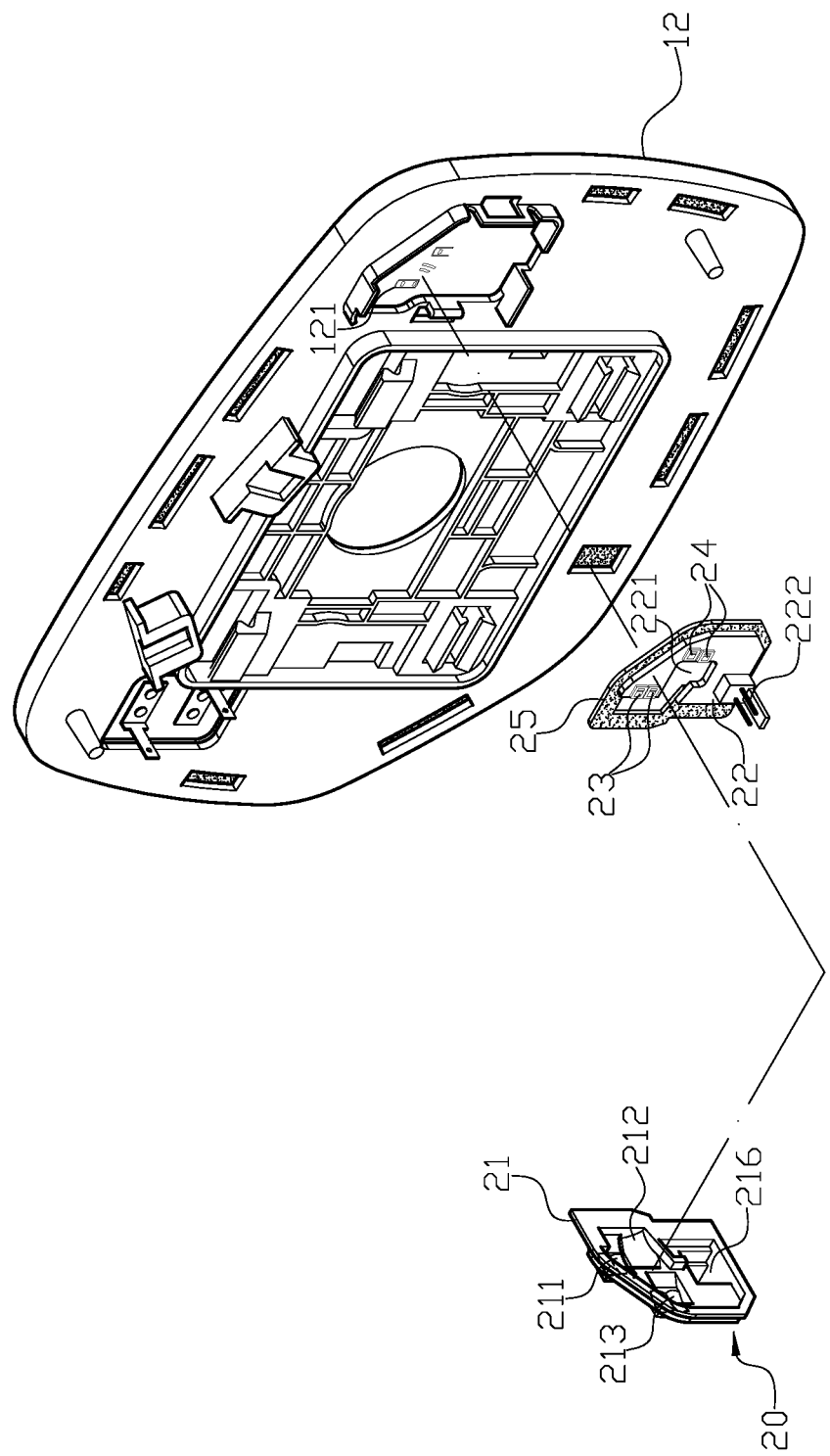
FIG. 2 is a three-dimensional exploded view of the vehicle blind spot detection system of the present invention.
Figure 3:
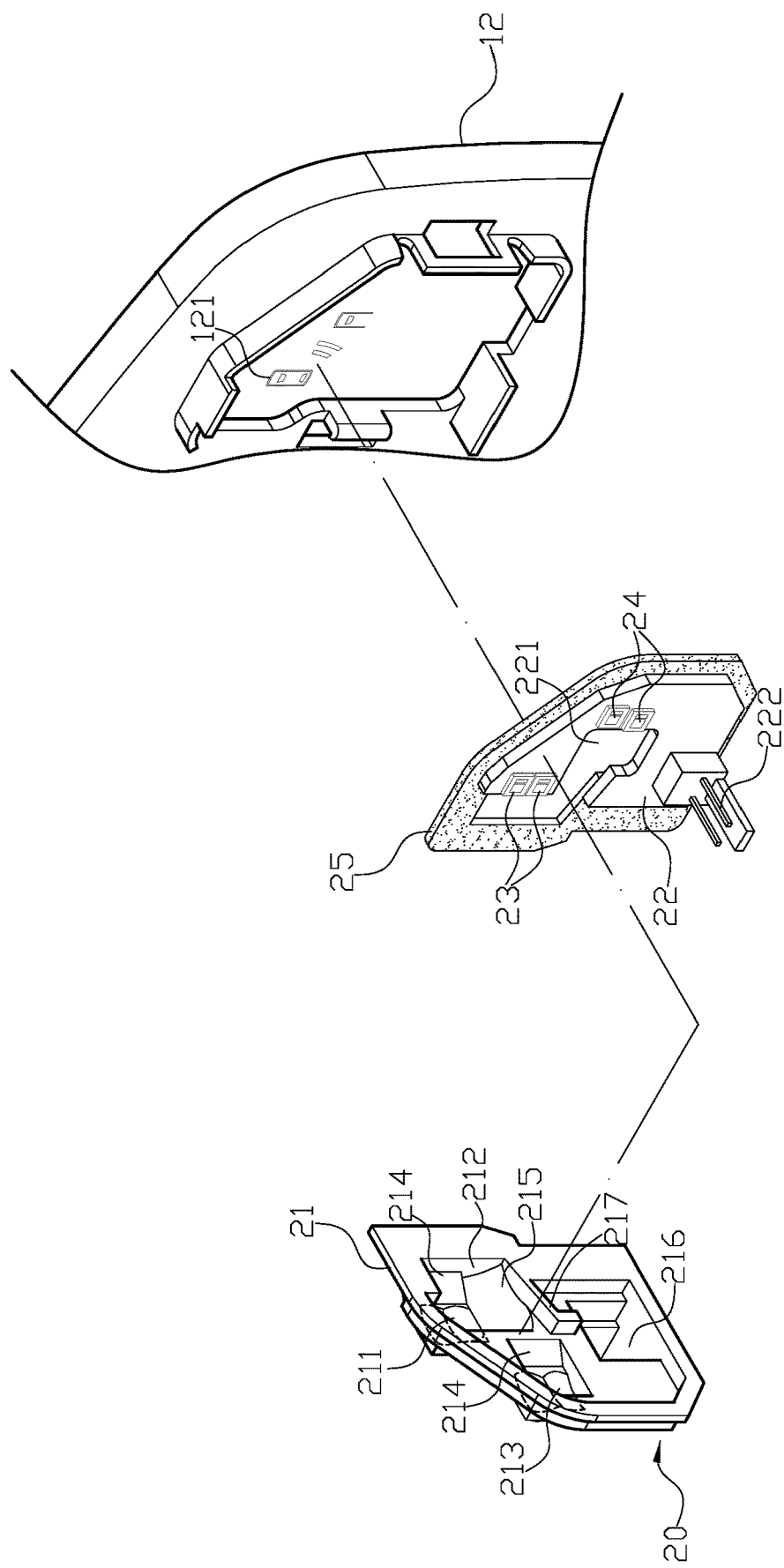
FIG. 3 is a partial enlarged view of the vehicle blind spot detection system of the present invention.
Figure 4:
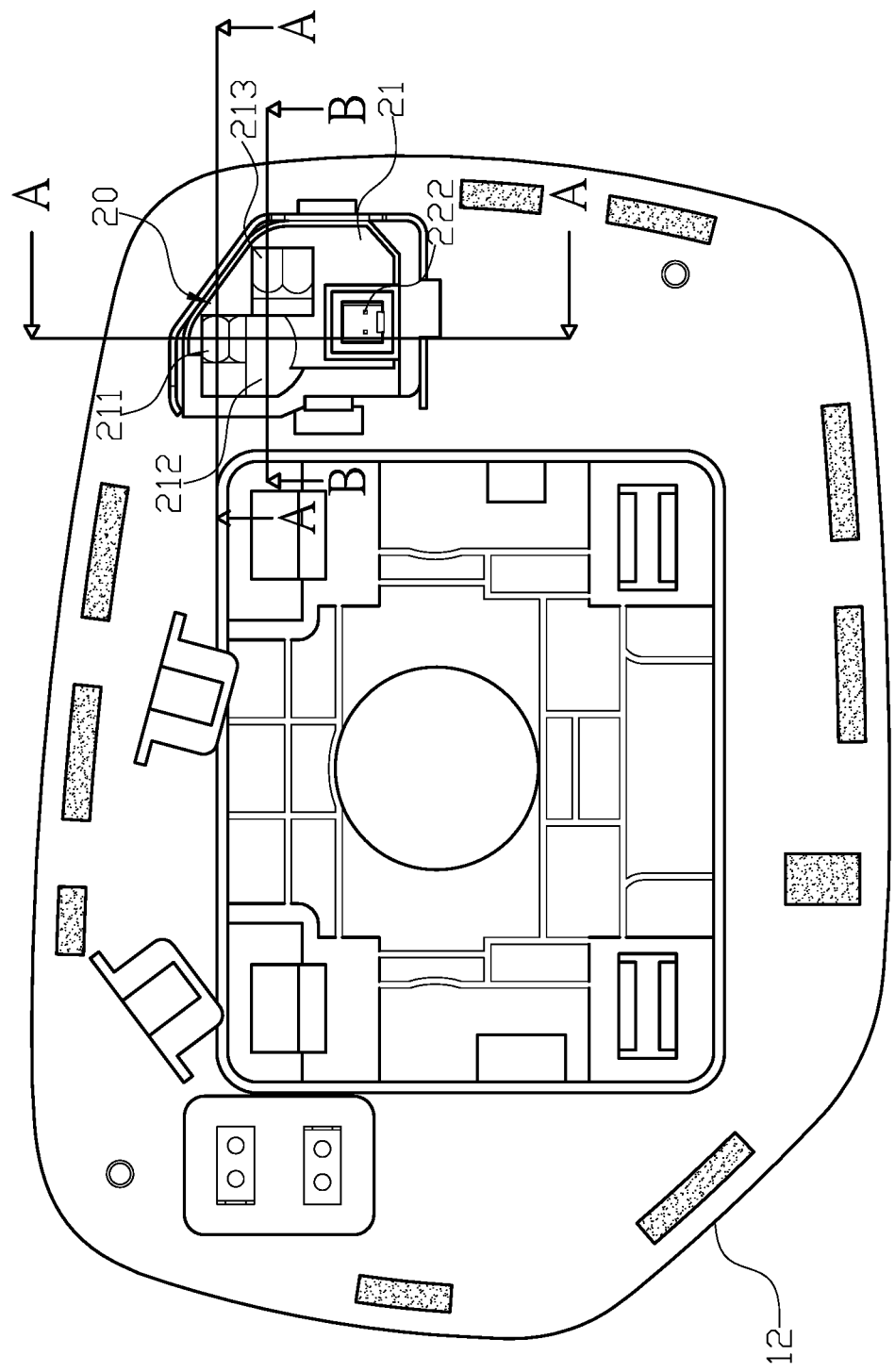
FIG. 4 is a plan assembly view of the vehicle blind spot detection system of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a vehicle blind spot detection system which comprises a rearview mirror (10) and an indicating unit (20). The rearview mirror (10) has a shell (11) and a mirror (12), and a transmitting area (121) is formed on the mirror (12). The indicating unit (20) installed in the shell (11) is horizontally aligned with the transmitting area (121) of the mirror (12). The mirror (12) is used for viewing the area behind a vehicle, so that, in the present invention, the moving direction of the vehicle is defined as the front side. The indicating unit (20) comprises a light-guiding base (21) and a circuit board (22), and a front side of the light-guiding base (21) has a recess to form a first housing (211), a light-gathering room (212), and a second housing (213) therein. The first housing (211) and the second housing (213) are formed in the same vertical plane at different heights, and the light-gathering room (212) is communicated with a bottom edge of the first housing (211) and formed at the same height of the second housing (213). Each of the first housing (211) and the second housing (213) has an inclined light-guiding surface (214) at the same lateral side thereof which is gradually expanded from front to rear, and the light-guiding surface (214) of the second housing (213) is located adjacent to the light-gathering room (212). A curved light-emitting surface (215) is formed at a bottom edge of the light-gathering room (212). A first light emitter (23) and a second light emitter (24) are respectively mounted on the circuit board (22), and the circuit board (22) has a through hole (221). When the circuit board (22) is coupled on a rear side of the light-guiding base (21), the first light emitter (23) and the second light emitter (24) are respectively accommodated in the first housing (211) and the second housing (213). Moreover, the circuit board (22) comprises a terminal pin (222), and the light-guiding base (21) has a connecting portion (216) formed at a position corresponding to the terminal pin (222). The terminal pin (222) is configured to be positioned in the connecting portion (216), so that the terminal pin (222) and the connecting portion (216) are adapted to electrically connect to blind spot sensors installed on two lateral sides of the vehicle through terminal wires. A rear side of the circuit board (22) is connected to the mirror (12), and the light-gathering room (212), the through hole (221), and the transmitting area (121) are horizontally aligned.

In one embodiment, a blocking edge (217) connected at a bottom edge of the light-guiding surface (214) is gradually raised from front to rear, and the blocking edge (217) is adapted to block excessive divergence of light.

In another embodiment, the first light emitter (23) is a LED light.

In still another embodiment, the second light emitter (24) is a LED light.

In a further embodiment, both of the first light emitter (23) and the second light emitter (24) are LED lights.

In still a further embodiment, the circuit board (22) is firmly attached to the mirror (12) through a double-sided adhesive patch (25).

Figure 5:
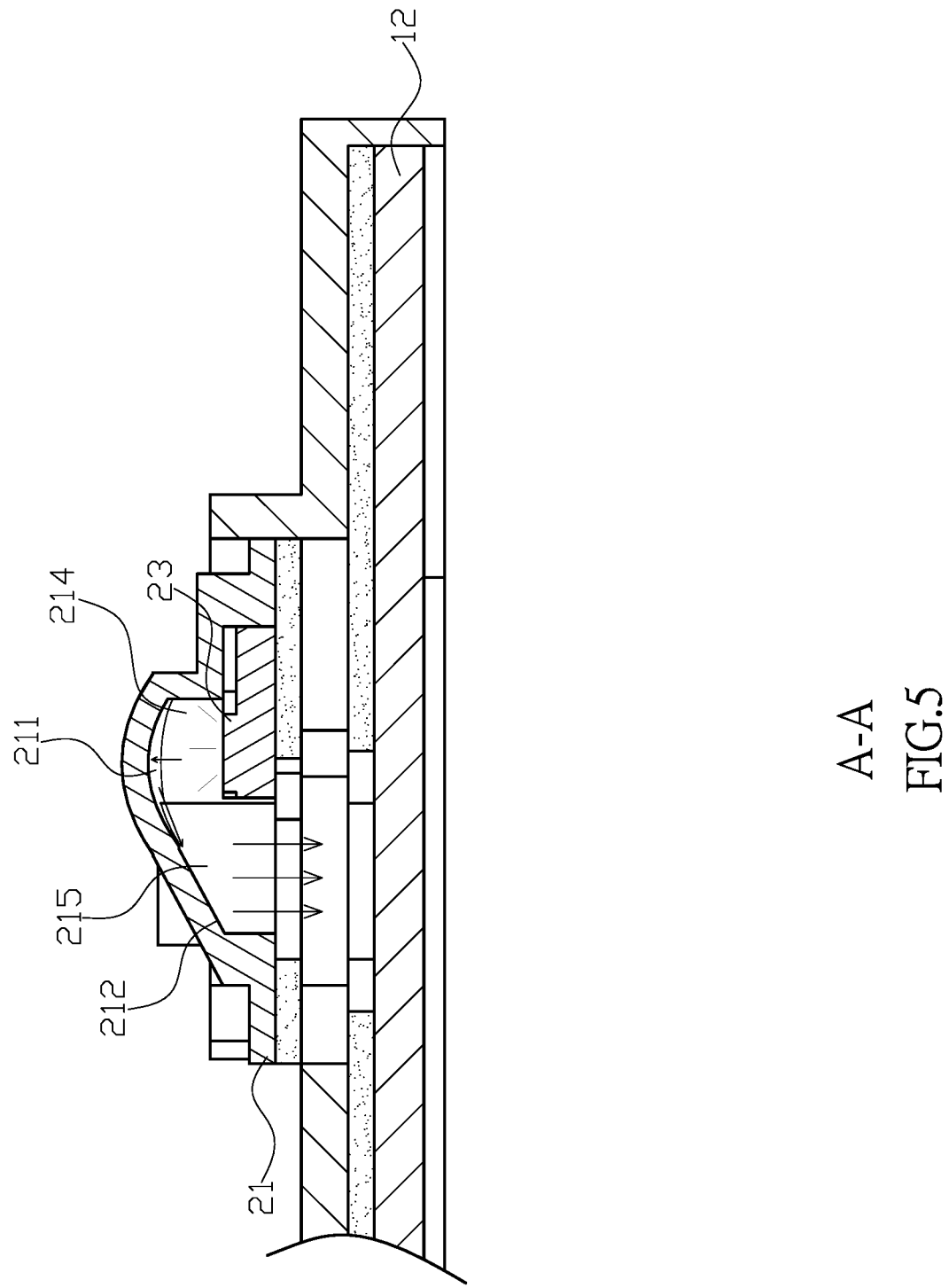
FIG. 5 is a schematic view illustrating the emitted light from a first light emitter of the vehicle blind spot detection system of the present invention is refracted.
Figure 6:
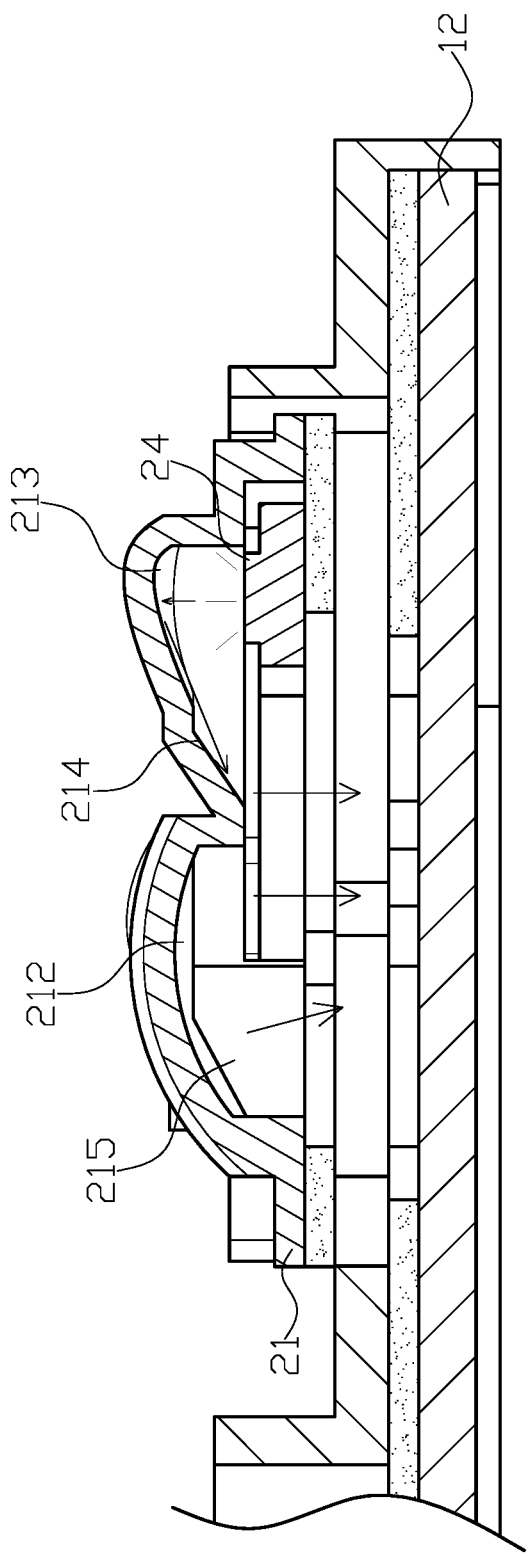
FIG. 6 is a schematic view illustrating the emitted light from a second light emitter of the vehicle blind spot detection system of the present invention is refracted.
Figure 7:
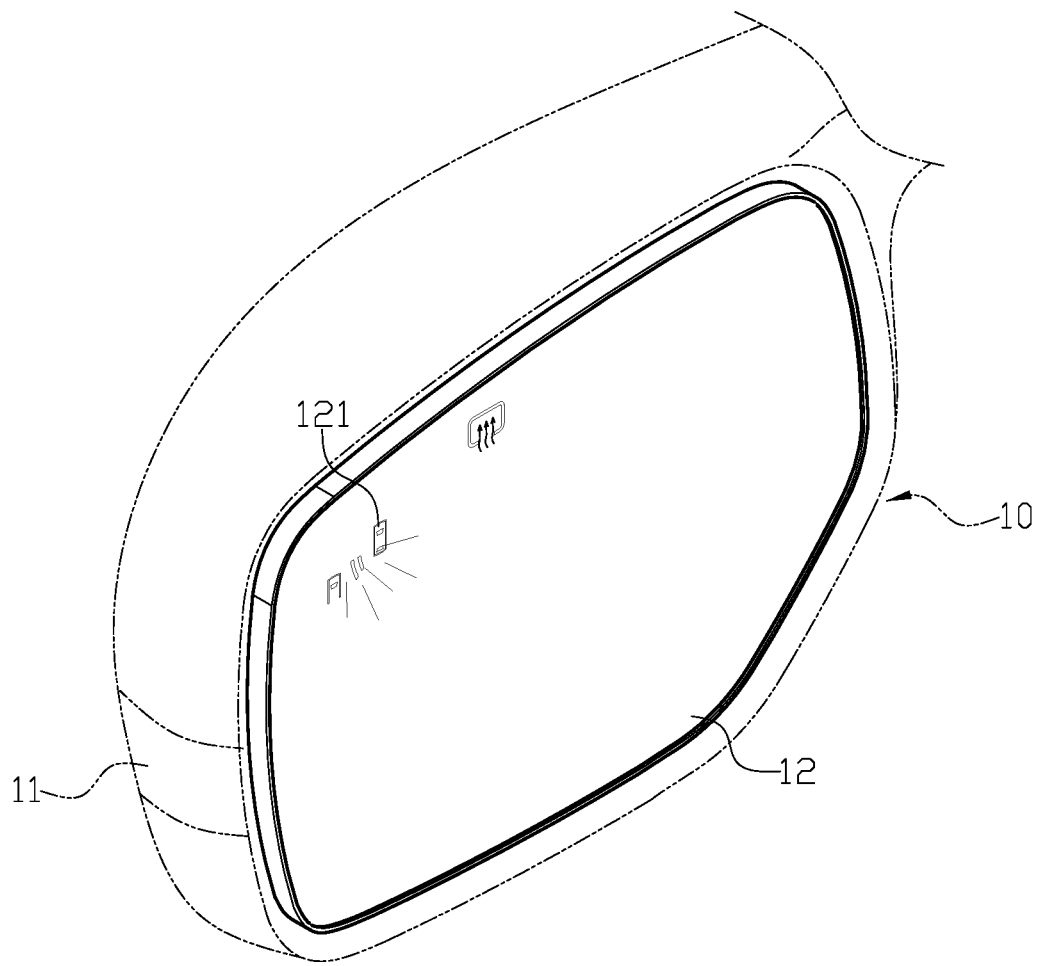

In actual application, the indicating unit (20) is electrically connected to the blind spot sensors installed on the two lateral sides of the vehicle. When a rear vehicle enters the blind spot area of the rearview mirror (10) and the blind spot sensors detect the vehicle, the vehicle blind spot detection system is adapted to turn on the first light emitter (23) and the second light emitter (24), and the emitted lights are adapted to pass through the transmitting area (121) of the mirror (12) to achieve the warning effect to the driver. Moreover, the light from the first light emitter (23) is configured to pass through and be refracted by the light-guiding surface (214), and the light-gathering room (212) collects the incoming lights. Thereafter, the lights are diffused evenly through the curved light-emitting surface (215) and emitted through the through hole (221) to the transmitting area (121) (as shown in FIGS. 5 and 7). The indirect irradiation and uniform diffusion of light can significantly reduce glare when used in nighttime, thereby avoiding the unexpected traffic accidents, Furthermore, the second light emitter (24) is turned on with the first light emitter (23) at the same time, and the light from the second light emitter (24) is configured to pass through and be refracted by the light-guiding surface (214) in the second housing (213) so as to become fill light for the first light emitter (23) (as shown in FIGS. 6 and 7), thereby avoiding the situation that the light is too dim when the first light emitter (23) is used alone.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A vehicle blind spot detection system comprising a rearview mirror and an indicating unit;
   wherein the rearview mirror has a shell and a mirror, and a transmitting area is formed on the mirror; the indicating unit installed in the shell is horizontally aligned with the transmitting area of the mirror; and
   wherein the indicating unit comprises a light-guiding base and a circuit board, and a front side of the light-guiding base has a recess to form a first housing, a light-gathering room, and a second housing therein; the first housing and the second housing are formed in the same vertical plane at different heights, and the light-gathering room is communicated with a bottom edge of the first housing and formed at the same height of the second housing; each of the first housing and the second housing has an inclined light-guiding surface at the same lateral side thereof which is gradually expanded from front to rear, and the light-guiding surface of the second housing is located adjacent to the light-gathering room, and a curved light-emitting surface is formed at a bottom edge of the light-gathering room; a first light emitter and a second light emitter are respectively mounted on the circuit board, and the circuit board has a through hole; when the circuit board is coupled on a rear side of the light-guiding base, the first light emitter and the second light emitter are respectively accommodated in the first housing and the second housing; the circuit board comprises a terminal pin, and the light-guiding base has a connecting portion formed at a position corresponding to the terminal pin; the terminal pin is configured to be positioned in the connecting portion, so that the terminal pin and the connecting portion are adapted to electrically connect to blind spot sensors installed on two lateral sides of a vehicle through terminal wires; a rear side of the circuit board is connected to the mirror, and the light-gathering room, the through hole, and the transmitting area are horizontally aligned.

2. The vehicle blind spot detection system of claim 1, wherein a blocking edge connected at a bottom edge of the light-guiding surface is gradually raised from front to rear, and the blocking edge is adapted to block excessive divergence of light.

3. The vehicle blind spot detection system of claim 1, wherein the first light emitter is a LED light.

4. The vehicle blind spot detection system of claim 1, wherein the second light emitter is a LED light.

5. The vehicle blind spot detection system of claim 1, wherein both of the first light emitter and the second light emitter are LED lights.

6. The vehicle blind spot detection system of claim 1, wherein the circuit board is firmly attached to the mirror through a double-sided adhesive patch.

\* \* \* \* \*